April 5, 1949.　　　　F. G. ZAGAR　　　　2,466,651
CHUCK

Filed March 10, 1944　　　　　　　　　　　2 Sheets-Sheet 1

INVENTOR
*Frank G. Zagar*
BY
*Evans & McCoy*
ATTORNEYS

April 5, 1949.  F. G. ZAGAR  2,466,651
CHUCK

Filed March 10, 1944  2 Sheets-Sheet 2

INVENTOR
*Frank G. Zagar*
BY
*Evans + McCoy*
ATTORNEYS

Patented Apr. 5, 1949

2,466,651

UNITED STATES PATENT OFFICE 2,466,651

CHUCK

Frank G. Zagar, Euclid, Ohio, assignor to Zagar Tool, Inc., Euclid, Ohio, a corporation of Ohio Application March 10, 1944, Serial No. 525,873

5 Claims. (Cl. 279—50)

The device of the present invention is a collet chuck of the type adapted to be mounted upon a rotating spindle such as a lathe spindle and having clamping members adapted to be moved to or from clamping position while the machine is in operation.

Objects of the invention are to provide a chuck of simple and inexpensive design and of rugged and durable construction and to provide a simple and compact operating mechanism by which effective clamping pressure may be applied to the member clamped in the chuck.

With the above and other objects in view the invention may be said to comprise the chuck as illustrated in the accompanying drawings hereinafter described and particularly set forth in the appended claims together with such variations and modifications thereof as will be apparent to one skilled in the art to which the invention pertains.

Reference should be had to the accompanying drawings forming part of this specification in which.

Figures 1, 2:
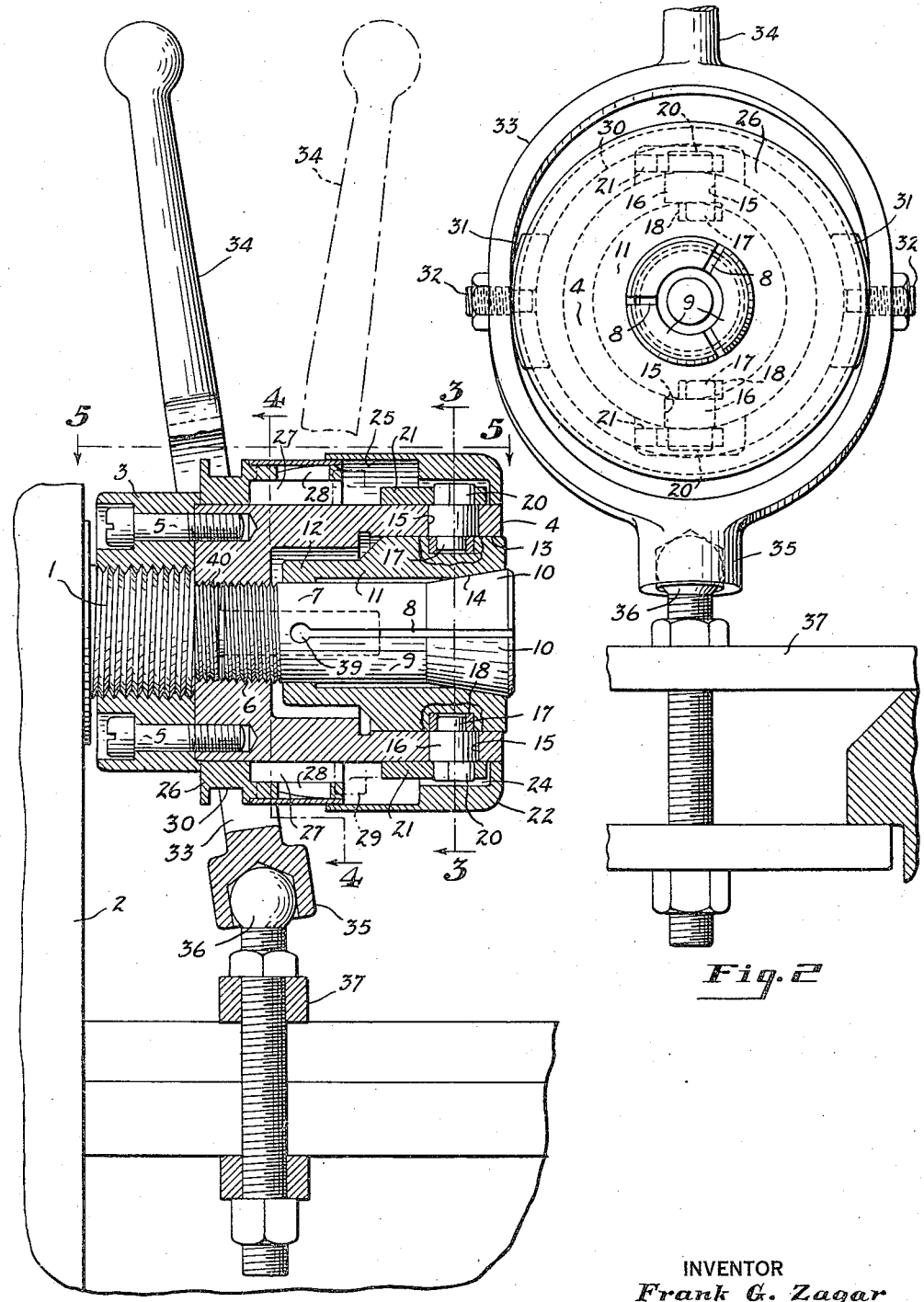
Figure 1 is an axial section through a chuck embodying the invention, showing the same applied to a lathe spindle.
Fig. 2 is an elevation looking toward the outer end of the chuck.
Figure 5:
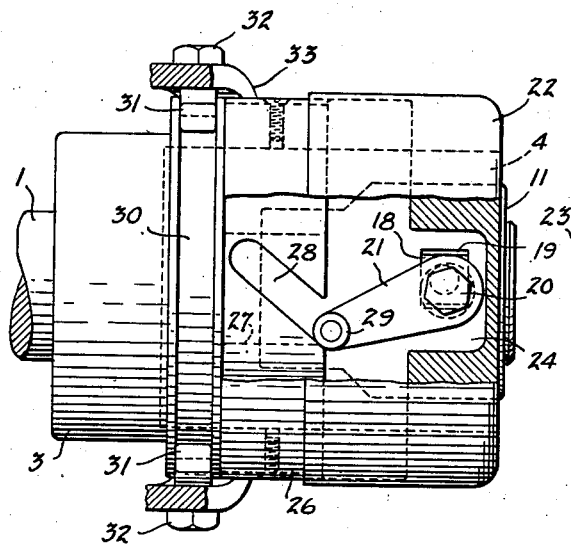
Fig. 5 is a side elevation of the chuck with a portion of the cover broken away to show the actuating sleeve and one of the cam levers in releasing position.
Figure 3:
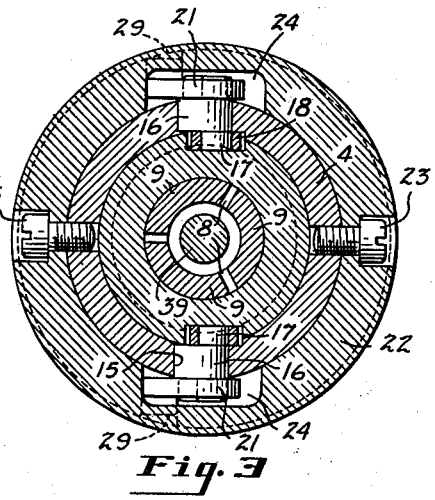
Fig. 3 is a section taken on the line indicated at 3—3 in Fig. 1.
Figure 6:
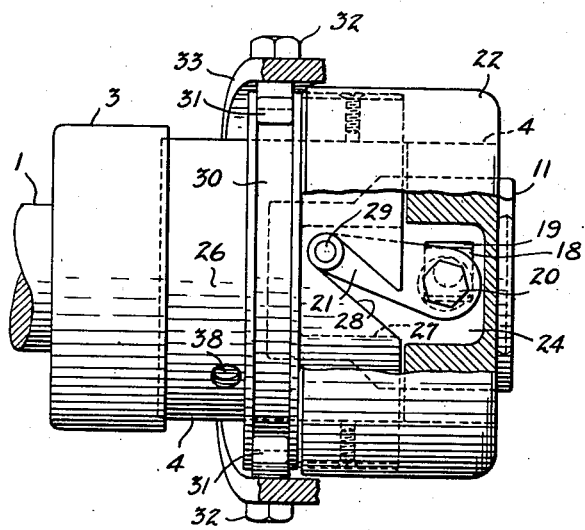
Fig. 6 is a view similar to Fig. 5 showing the parts in clutch locking position.
Figure 4:
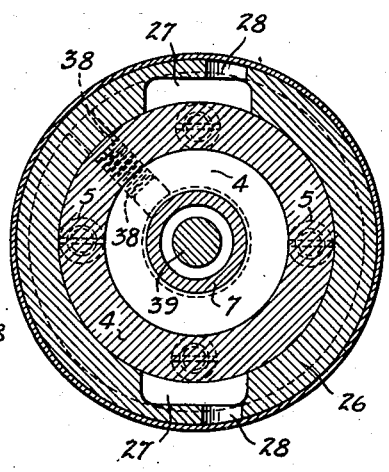
Fig. 4 is a section taken on the line indicated at 4—4 in Fig. 1.

In the accompanying drawings a chuck embodying the invention is shown mounted upon a spindle 1 which is mounted on the head stock 2 of a lathe. A suitable adapter 3 is shown mounted upon the end of the spindle 1, the adapter 3 herein shown being in the form of a threaded collar screwed upon the spindle. A tubular retainer member 4 is rigidly secured to the adapter 3 in axial alinement with the spindle 1 by suitable means such as bolts 5. The retainer 4 has a central threaded opening 6 at its inner end in which the threaded inner end of a collet 7 is screwed, the collet 7 being tubular and having slots 8 extending axially from its outer end to provide resilient clamping segments 9. The segments 9 have tapering external faces 10 and are normally held by their own resilience in a releasing position. The segments 9 are adapted to be moved radially inwardly to clamping position by means of a bushing 11 fitting on the collet within the retainer 4. The bushing 11 has an internal bearing portion 12 at its inner end that slidably fits on the collet 7 and an external bearing portion 13 at its outer end which slidably fits within the interior of the tubular retainer 4. The bushing 11 has a tapering internal face 14 at its outer end which is adapted to engage the inclined faces 10 of the collet segments 9 when the bushing is moved axially in one direction to force the said segments radially inward to clamping position. As herein shown the faces 10 of the collet and the internal face 14 of the bushing 11 taper inwardly from the outer ends of the collet and bushing and the bushing is moved outwardly for clamping.

Adjacent its outer end the retainer 4 has radial bores 15 in its tubular wall in which cams 16 are rotatably mounted. Two bores 15 are provided and these bores are positioned diametrically opposite each other in coaxial relation. Each cam 16 has an eccentrically disposed pin 17 projecting from its inner face that engages a block or shoe 18 that is slidably mounted in a circumferentially elongated slot 19 in the bushing 11. Each of the cams 16 also has an outer centrally disposed projection 20 to which a lever arm 21 is nonrotatably secured. For convenience of assembly the projection 20 is preferably of hexagonal form and the lever 21 has a hexagonal opening to receive the projection. The levers 21 are parallel and disposed at right angles to the axes of the cams 16, extending axially toward the inner end of the retainer.

Upon the forward end of the retainer 4 a cover sleeve 22 is secured, the cover 22 being bored to fit the forward end of the retainer and being rigidly secured thereto by means of bolts 23. The cover 22 has internal recesses 24 to receive the levers 21 and at its inner end has a counterbore 25 providing an annular space around the retainer 4 of sufficient radial depth to receive a sliding sleeve 26 that fits upon the inner end of the retainer 4. The sliding sleeve 26 has interior recesses 27 alined with the recesses 24 of the cover sleeve 22 to receive the inner ends of the levers 21 and the outer walls of the recesses 27 are provided with laterally inclined cam slots or grooves 28 which receive outwardly projecting pins 29 mounted on the ends of the lever arms 21. When the sleeve 26 is moved toward the outer end of the retainer 4 the pins 29 are simultaneously shifted laterally by the cam slots 28 so as to simultaneously turn the two cams 16 in a direction to move the bushing 11 outwardly against the flaring ends 10 of the collet segments 9. Since the two cam slots 28 are of opposed angularity, the sleeve 26 is positively held against circumferential movement with respect to the retainer 4 and the levers 21 are held by the cam slots in the positions to which they are adjusted by the sleeve.

Because of the leverage between the sleeve 26 and the bushing actuating pins 17 a very substantial pressure may be applied to the collet segments.

Means is provided for shifting the sleeve 26 during rotation of the spindle so that stock may be clamped or released without stopping the rotation of the spindle. The sleeve 26 is provided at its inner end with a circumferential groove 30 adapted to receive shoes 31 at opposite sides of the sleeve which are engaged and held in place by pivot pins 32 mounted in the yoke portion 33 of an actuating lever 34. The lever 34 has an open socket 35 at its lower end that receives a ball pivot 36 secured to a suitable support 37 that is adapted to be clamped to the ways of the lathe in proper position with respect to the head stock, so that the chuck may be readily adjusted to the proper position with respect to the headstock. The open socket of the lever 34 permits removal of the chuck from the spindle without removal of the pivot 36.

For positively locking the collet 7 in adjusted position a set screw 38 may be provided in the tubular retainer 4, the length of the screw 38 being less than the thickness of wall at the inner end of the retainer so that the screw does not interfere with the operation of the sleeve 26, the screw 38 being so positioned that it is accessible when the sleeve 26 is in clamping position.

If desired, a stop 39 may be mounted within the collet 7. As shown in Fig. 1 the stop 39 is positioned centrally within the inner end of the collet 7 and has an enlarged threaded end 40 that screws into the threaded opening 6 of the retainer inwardly of the threaded end of the collet 7.

It is to be understood that variations and modifications of the specific device herein shown and described for purposes of illustration, may be made without departing from the spirit of the invention.

What I claim is:

1. A chuck comprising a tubular retainer, a collet mounted centrally within said retainer and having clamping jaws, a bushing axially slidable upon the collet within the retainer for actuating said jaws, two parallel levers mounted upon said retainer to swing tangentially with respect to the retainer about diametrically alined pivots and connected to said bushing to actuate the same, and an actuating sleeve slidable on the retainer and having cam portions engaging said levers.

2. A chuck comprising a tubular retainer, a collet mounted in said retainer centrally thereof, a collet actuating bushing mounted to slide axially on said collet, cams mounted in said retainer to turn about radial axes each having an inwardly projecting eccentrically disposed pin engageable with said bushing to impart axial movement thereto, an arm fixed to each cam exteriorly of said retainer, and a sleeve axially slidable on said retainer and having cam portions engageable with said arms to turn said cams.

3. A chuck comprising a tubular retainer having diametrically opposite radial bores in the wall thereof, a bushing within the retainer, a cam rotatably mounted in each of said bores, each cam having an inwardly projecting eccentrically disposed pin for imparting axial movement to said bushing, an arm fixed to each cam exteriorly of the retainer, said arms being parallel and each having an outwardly projecting pin at its outer end and an actuating sleeve slidable upon said retainer and having cam slots of opposed angularity adapted to receive said pins.

4. A chuck comprising a tubular retainer having diametrically opposite radial bores in the wall thereof, a cam rotatably mounted in each of said bores, each cam having an inwardly projecting eccentrically disposed pin for imparting axial movement to said bushing, an arm fixed to each cam exteriorly of the retainer, said arms being parallel and each having an outwardly projecting pin at its outer end, a cover sleeve fixed to said retainer and having recesses to accommodate said arms, an actuating sleeve telescopically received within an end of said cover sleeve and having cam slots of opposed angularity adapted to receive said pins.

5. A chuck comprising a tubular retainer having a central opening at its inner end and diametrically opposite radial bores in the wall thereof adjacent its outer end, a collet secured at its inner end in said central opening and having clamping jaws at its outer end, a jaw actuating bushing slidable on the collet and within said retainer, cams rotatably mounted in said bores and having eccentric pins engaging with said bushing to impart axial movement thereto, arms fixed to said cams exteriorly of said retainer and extending inwardly toward the inner end of said retainer, a sleeve slidable upon the inner end portion of said retainer and having cam portions engageable with said arms to simultaneously turn said cams upon an axial movement of said sleeve, and a cover sleeve fixed to the outer end portion of said retainer, said sleeve having internal recesses to receive said arms and having an inner end portion of an internal diameter to telescopically receive said slidable sleeve.

FRANK G. ZAGAR.

REFERENCES CITED

The following references are of record in the file of this patent:

UNITED STATES PATENTS

| Number | Name | Date |
|---|---|---|
| 388,573 | Mosely | Aug. 28, 1888 |
| 412,027 | Hartness et al. | Oct. 1, 1889 |
| 442,230 | Libby | Dec. 9, 1890 |
| 981,566 | Jarvis | Jan. 10, 1911 |
| 1,938,573 | Amonsen | Dec. 12, 1933 |
| 2,335,721 | Zagar | Nov. 30, 1943 |

FOREIGN PATENTS

| Number | Country | Date |
|---|---|---|
| 87,070 | Switzerland | 1921 |